(12) United States Patent
Vilà et al.

(10) Patent No.: US 9,935,708 B2
(45) Date of Patent: Apr. 3, 2018

(54) COHERENT OPTICAL SPECTRUM ANALYSER FOR MONITORING A SPECTRUM OF A FIBRE LINK

(71) Applicant: TELEFONAKTIEBOLAGET LM ERICSSON (PUBL), Stockholm (SE)

(72) Inventors: Chantal Vilà, Sant Cugat del Valles (ES); Gregori Azcarate, Sant Cugat del Valles (ES); Robert Pous, Premia de Mar (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/422,734

(22) Filed: Feb. 2, 2017

(65) Prior Publication Data

US 2017/0230111 A1    Aug. 10, 2017

(30) Foreign Application Priority Data

Feb. 5, 2016    (EP) ...................................... 16382049

(51) Int. Cl.
*H04B 10/079*    (2013.01)
*H04B 10/61*    (2013.01)
(Continued)

(52) U.S. Cl.
CPC ... *H04B 10/0795* (2013.01); *H04B 10/07957* (2013.01); *H04B 10/2504* (2013.01);
(Continued)

(58) Field of Classification Search
CPC ............... H04B 10/07; H04B 10/075–10/0799
See application file for complete search history.

(56) References Cited

U.S. PATENT DOCUMENTS

| | | | |
|---|---|---|---|
| 2002/0167718 A1* | 11/2002 | Falquier | H01S 3/06754 359/341.1 |
| 2004/0013352 A1* | 1/2004 | Khayim | G02B 6/4215 385/24 |

(Continued)

FOREIGN PATENT DOCUMENTS

| | | |
|---|---|---|
| EP | 1184660 A2 | 3/2002 |
| EP | 2348651 A1 | 7/2011 |
| WO | 2011054382 A1 | 5/2011 |

OTHER PUBLICATIONS

FTB-5240S/BP Optical Spectrum Analyzers, 2 pages, downloaded Jan. 7, 2016 from http://www.exfo.com/products/field-network-testing/bu3-optical/spectral-testing/ftb-5240sbp.
(Continued)

*Primary Examiner* — Nathan Cors

(57) ABSTRACT

A coherent optical spectrum analyzer for monitoring a spectrum of a fiber link is provided. The coherent optical spectrum analyzer comprises an input connectable to the fiber link, the input being connected to a first input of a coherent detector having at least two input, the first and a second input, and an output. The coherent optical spectrum analyzer further comprises a local oscillator having an output connected to the second input of the coherent detector, wherein the output of the coherent detector is connected to a first input of a processing unit, the processing unit also being connected to an input of the local oscillator, the processing unit being configured for analyzing information from the coherent detector. The local oscillator comprises a semiconductor laser tuned by temperature to a specific wavelength and swept by changing a bias current, the local oscillator being controlled by the processing unit.

7 Claims, 5 Drawing Sheets

(51) Int. Cl.
*H04Q 11/00* (2006.01)
*H04B 10/50* (2013.01)
*H04J 14/06* (2006.01)
*H04B 10/25* (2013.01)

(52) U.S. Cl.
CPC .......... *H04B 10/503* (2013.01); *H04B 10/61* (2013.01); *H04J 14/06* (2013.01); *H04Q 11/0005* (2013.01)

(56) References Cited

U.S. PATENT DOCUMENTS

| | | | |
|---|---|---|---|
| 2004/0190899 A1* | 9/2004 | Torii | H04B 10/07953 398/33 |
| 2010/0085992 A1 | 4/2010 | Rakuljic et al. | |
| 2011/0091206 A1 | 4/2011 | He et al. | |
| 2014/0016927 A1* | 1/2014 | Khatana | H04B 10/61 398/25 |
| 2017/0207849 A1* | 7/2017 | Sinclair | H04B 10/0795 |

OTHER PUBLICATIONS

Optical Spectrum Analyzer MS9740A Specification, 2 pages, downloaded Jan. 7, 2016 from https://www.anritsu.com/en-US/test-measurement/products/ms9740a.

BOSA models and specs, 1 page, downloaded Jan. 7, 2016 from http://aragonphotonics.com/models/.

Optical Spectrum Analyzer Specifications, 2 pages, downloaded Jan. 7, 2016 from http://www.apex-t.com/optical-spectrum-analyzer/.

* cited by examiner

COHERENT OPTICAL SPECTRUM ANALYSER FOR MONITORING A SPECTRUM OF A FIBRE LINK

RELATED APPLICATIONS

This application claims priority to European Patent Application No. 16382049.1 filed Feb. 5, 2016, the disclosure of which is fully incorporated herein by reference.

TECHNICAL FIELD

The present disclosure relates to monitoring of an optical spectrum and in particular to coherent optical spectrum analyser for monitoring a spectrum of a fibre link.

BACKGROUND

Due to increased demand of bandwidth and bit rates per channel, access technologies are moving forward to coherent systems. This requires the detection of complex phase modulation with wide spectral efficiency. Furthermore, the networks' efficiency is, in turn, being enhanced by reducing their channel spacing (ultra-Dense-WDM-PON, WDM-PON being short for Wavelength Divisional Multiplexing Passive Optical Network). Therefore, it has become usual to work with a distance between channels of 50 GHz and it tends to be rapidly reduced to 12.5 GHz and beyond.

The spectra measurement of these optical networks is done by Optical Spectrum Analysers, OSA. Depending on the technology that they use, all existing OSAs can be classified in four categories.

Diffraction grating-based OSA: It is the most common one. It uses a monochromator as the tunable optical filter.

Interferometer-based OSA: It may use either Fabry-Perot or Michelson interferometry.

Brillouin-based OSA: It works with the Stimulated Brillouin Scattering non-linear effect.

Coherent detection-based OSA: It combines a tunable narrow-linewidth laser (local oscillator) with the input signal.

These are all associated with various drawbacks. Diffraction grating-based OSA cannot be used for coherent systems, since it does not detect data phase information. It has a limited resolution due to grating's physical dimension; limited accuracy since expensive mechanical elements are needed for a high accuracy; and limited sweep time (in the order of seconds) due to mechanical movement. Interferometer-based OSA may achieve high resolution, but it has low dynamic range. It presents higher accuracy than the diffraction grating-based OSA but it is still limited by mechanical dimensions. Brillouin-based OSA may be used as coherent detector, but it needs a high power tunable laser. Moreover, these lasers are normally extremely expensive. This technology requires complex signal processing due to the non-linear effect. Coherent detection-based OSA is expensive and presents limited sweep time due to the mechanical components of the External Cavity Laser, ECL, tunable laser.

SUMMARY

The object is to obviate at least some of the problems outlined above. In particular, it is an object to provide a coherent optical spectrum analyser for monitoring a spectrum of a fibre link. These objects and others may be obtained by providing a coherent optical spectrum analyser according to the independent claims attached below.

According to an aspect coherent optical spectrum analyser for monitoring a spectrum of a fibre link is provided. The coherent optical spectrum analyser comprises an input connectable to the fibre link, the input being connected to a first input of a coherent detector having at least two inputs, the first and a second input, and an output. The coherent optical spectrum analyser further comprises a local oscillator having an output connected to the second input of the coherent detector, wherein the output of the coherent detector is connected to a first input of a processing unit, the processing unit also being connected to an input of the local oscillator, the processing unit being configured for analysing information from the coherent detector. The local oscillator comprises a semiconductor laser tuned by temperature to a specific wavelength and swept by changing a bias current, the local oscillator being controlled by the processing unit.

The coherent optical spectrum analyser has several possible advantages. One possible advantage is that the coherent optical spectrum analyser may be realised at low cost, and still meet all requirements to analyse ultra-dense coherent optical networks, achieving extreme resolution lower than 1 GHz and fast sweep time. It may be used within the optical network, without interrupting the communication during the measurement and enabling bidirectional monitoring. The coherent optical spectrum analyser combines (1) all functions implemented by standard optical spectrum analysers, such as spectrum visualisation, power measurement, user control with an easy-to-use interface, among others; and (2) monitoring functions, such as modulation detection and control of amplitude and wavelength variation in time.

BRIEF DESCRIPTION OF DRAWINGS

Embodiments will now be described in more detail in relation to the accompanying drawings, in which.

DETAILED DESCRIPTION

Briefly described, a coherent optical spectrum analyser for monitoring a spectrum of a fibre link is provided. The coherent optical spectrum analyser comprises cost effective components providing a high resolution monitoring and/or analysing system.

Embodiments herein relate to a coherent optical spectrum analyser for monitoring a spectrum of a fibre link. Various exemplifying embodiments will now be described with reference to FIGS. 1*a*-1*j*.

Figure 1A:
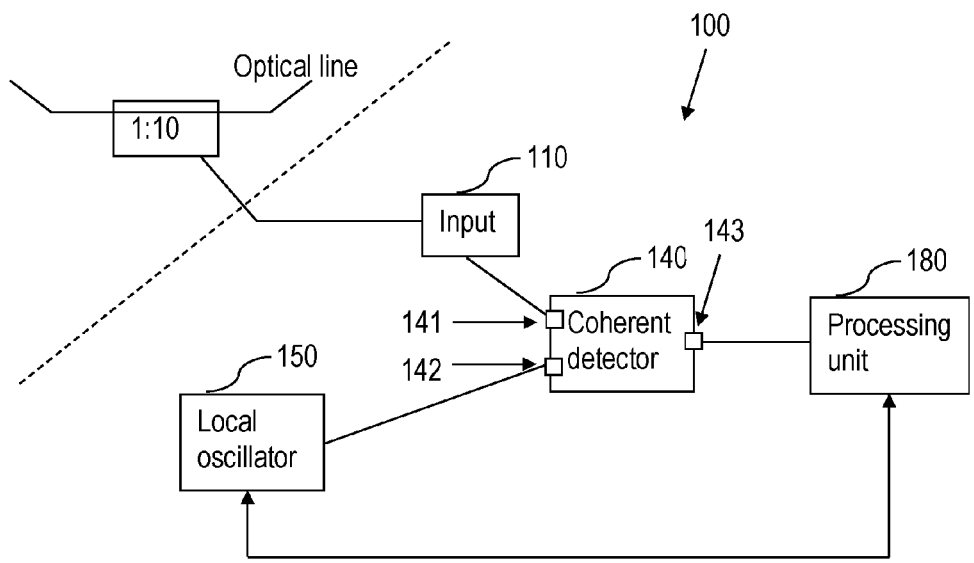
FIG. 1a is an illustration of a coherent optical spectrum analyser for monitoring a spectrum of a fibre link, according to an exemplifying embodiment.

FIG. 1*a* discloses the coherent optical spectrum analyser 100 comprising an input 110 connectable to the fibre link, the input being connected to a first input 141 of a coherent detector 140 having at least two input, the first 141 and a second input 142, and an output 143. The coherent optical spectrum analyser 100 further comprises a local oscillator 150 having an output connected to the second input 142 of the coherent detector 140, wherein the output 143 of the coherent detector 140 is connected to a first input of a processing unit 180, the processing unit 180 also being connected to an input of the local oscillator 150, the processing unit 180 being configured for analysing information from the coherent detector 140. The local oscillator 150 comprises a semiconductor laser tuned by temperature to a specific wavelength and swept by changing a bias current, the local oscillator 150 being controlled by the processing unit 180.

The input 110 of the coherent optical spectrum analyser 100 is connectable to the fibre link. When the fibre link is connected to the input 110, the coherent optical spectrum analyser 100 is configured to monitor and/or analyse the whole frequency spectrum of an optical stream signal of the fibre link. The input may induce a 1 dB penalty at the optical stream signal of the optical fibre. In other words, a fraction of the optical stream signal is diverted from the fibre link into the coherent optical spectrum analyser 100. The fraction of the optical stream signal is fed to the first input 141 of the coherent detector 140. The local oscillator generates lights comprising a range of wavelengths which are inputted to the second input 142 of the coherent detector 140. The local oscillator generates tunable light within a wavelength band which is inputted to the second input 142 of the coherent detector 140.

The coherent detector 140 uses the two inputs to detect the wavelengths carrying information of the spectrum of the optical stream signal. A group of contiguous wavelengths carrying information constitute a channel. In this manner, the coherent detector 140 may determine which wavelengths constitute respective channels and which wavelengths are not used. As a result, the coherent detector 140 may also determine the spacing, in wavelengths, between channels.

The result of the analysis of the coherent detector 140 is then fed to the processing unit 180. The processing unit is connected also to the local oscillator 150, wherein the processing unit 180 is configured to control the local oscillator 150. By, or under, the control of the processing unit 180 the semiconductor laser of the local oscillator 150 is tuned by temperature to a specific wavelength and swept by changing the bias current. In this manner, the local oscillator 150 is controlled to generate light sweeping the bandwidth of interest to be analysed or monitored by the coherent optical spectrum analyser 100.

The coherent optical spectrum analyser has several possible advantages. One possible advantage is that the coherent optical spectrum analyser may be realised at low cost, and still meet all requirements to analyse ultra-dense coherent optical networks, achieving extreme resolution lower than 1 GHz and fast sweep time. It may be used within the optical network, without interrupting the communication during the measurement. The coherent optical spectrum analyser combines (1) all functions implemented by standard optical spectrum analysers, such as spectrum visualisation, power measurement, user control with an easy-to-use interface, among others; and (2) monitoring functions, such as modulation detection and control of amplitude and wavelength variation in time.

Figure 1B:
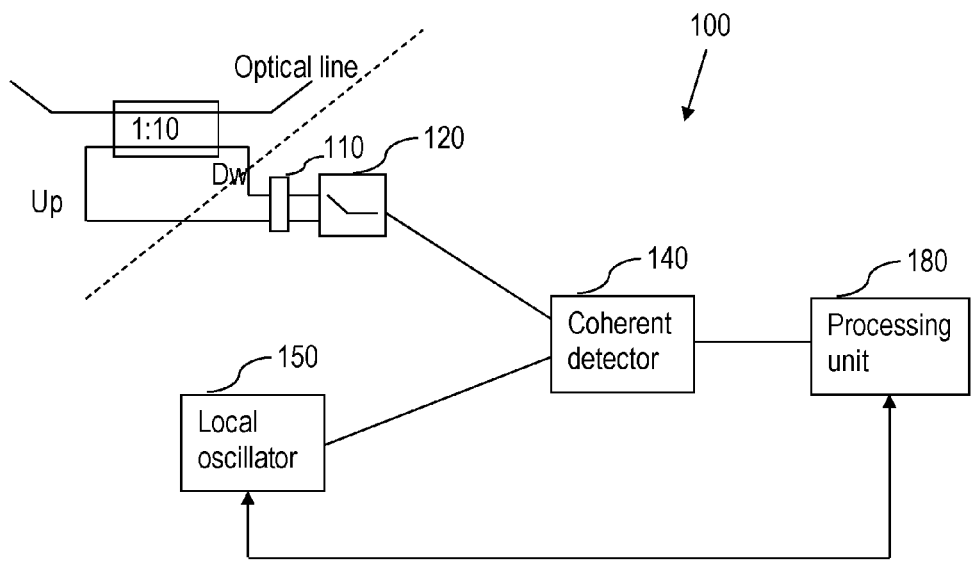
FIG. 1b is an illustration of a coherent optical spectrum analyser for monitoring a spectrum of a fibre link, according to an exemplifying embodiment.

FIG. 1*b* illustrates an embodiment in which the coherent optical spectrum analyser 100 further comprises a first switch 120, wherein the input 110 is connected to the first input 141 of the coherent detector 140 via the first switch 120, wherein the input 110 of the coherent optical spectrum analyser 100 comprises two ports, wherein the two input ports and the switch 120 enables the coherent optical spectrum analyser 100 to analyse the spectrum of the fibre link in both uplink and downlink. This enables a bidirectional monitoring, thereby providing a further advantage.

By the switch 120, the coherent optical spectrum analyser 100 may be configured with two ports, one port for downlink optical stream signals and one port for uplink optical stream signals.

Using the switch, the optical spectrum analyser 100 is configured to analyse and/or monitor both uplink and downlink channels/signals.

Figure 1C:
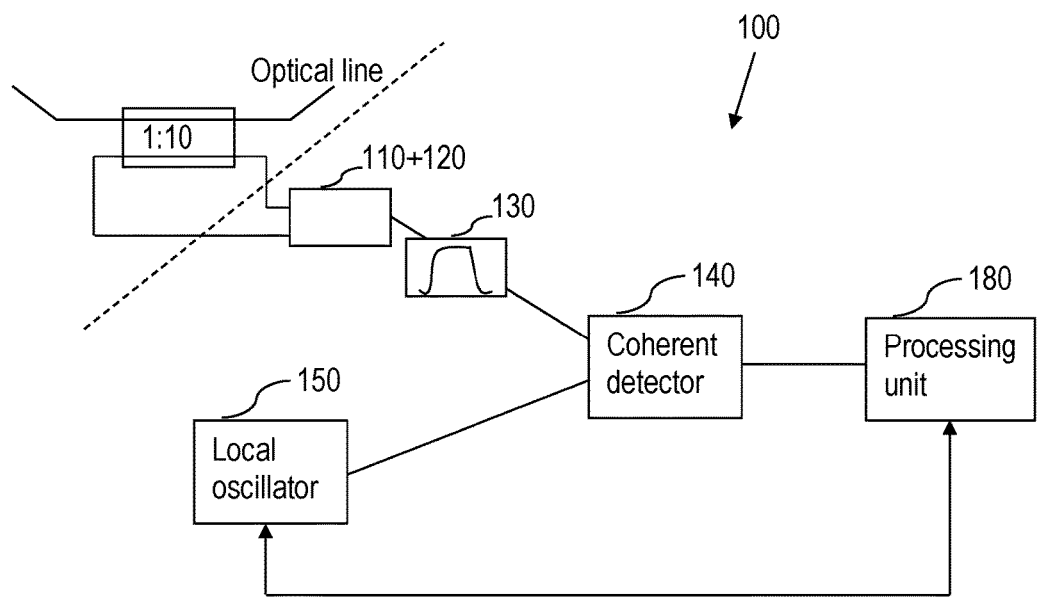
FIG. 1c is an illustration of a coherent optical spectrum analyser for monitoring a spectrum of a fibre link, according to an exemplifying embodiment.

FIG. 1*c* illustrates an embodiment in which the coherent optical spectrum analyser 100 further comprises a passband filter 130, wherein the input 110 is connected to the first input 141 of the coherent detector 140 via the first switch 120, the passband filter 130 having an input connected to the input 110 of the coherent optical spectrum analyser 100 or the switch 120, and the first input 141 of the coherent detector 140, wherein the passband filter 130 filters the spectrum of the fibre link so that only a bandwidth defined by the passband filter is analysed by the coherent optical spectrum analyser 100.

The passband filter 130 is configured to provide a bandwidth to be analysed or monitored to the coherent detector 140. Wavelengths outside that bandwidth are filtered out, or blocked by the passband filter 130. Be the coherent optical spectrum analyser 100 being configured with the passband filter 130, a sub band or a predefined bandwidth of the spectrum of the frequency spectrum of the optical stream signal of the fibre link may be monitored or analysed. The sub band or the predefined bandwidth of the spectrum of the frequency spectrum is determined by the passband filter 130.

Figure 1D:
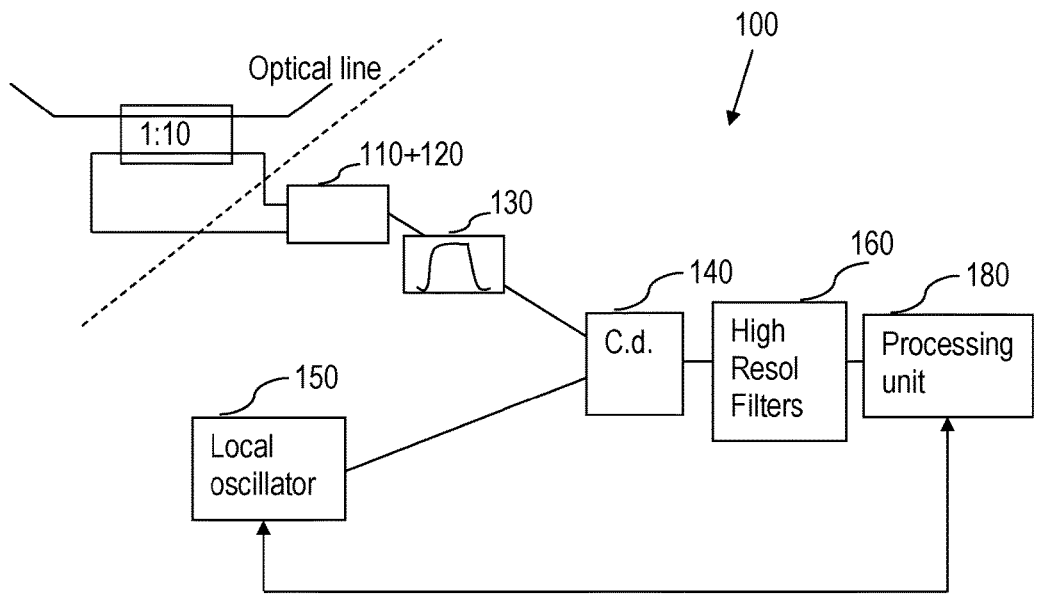
FIG. 1d is an illustration of a coherent optical spectrum analyser for monitoring a spectrum of a fibre link, according to an exemplifying embodiment.

FIG. 1*d* illustrates an embodiment in which the coherent optical spectrum analyser 100 further comprises a set of high resolution filters 160, wherein the output 143 of the coherent detector 140 is connected to the first input of the processing unit 180 via the set of high resolution filters 160, the set of high resolution filters 160 having an input connected to the output 143 of the coherent detector 140 and an output coupled to the processing unit 180, the high resolution filters 160 being controlled by the processing unit.

The set of high resolution filters 160 are configured to receive the output from the coherent detector 140. The output from the coherent detector 140 comprises information about spacing between channels, bandwidth of channels and on which wavelengths the various channels are carried or allocated.

The set of high resolution filters 160 is controlled by the processing unit and it defines resolution of the optical spectrum analyser. Thus, the set of high resolution filters 160 receives output from the coherent detector 140 and depending on the bandwidth of the selected filter may be set the OSA's optical resolution (e.g. 10 MHZ, 100 MHz, 1 GHZ . . . ).

The output of the set of high resolution filters 160 is then outputted to the processing unit 180, wherein the processing unit may use the output to control the set of high resolution filters 160, e.g. select the filter to be used according to the resolution needed.

Figure 1E:
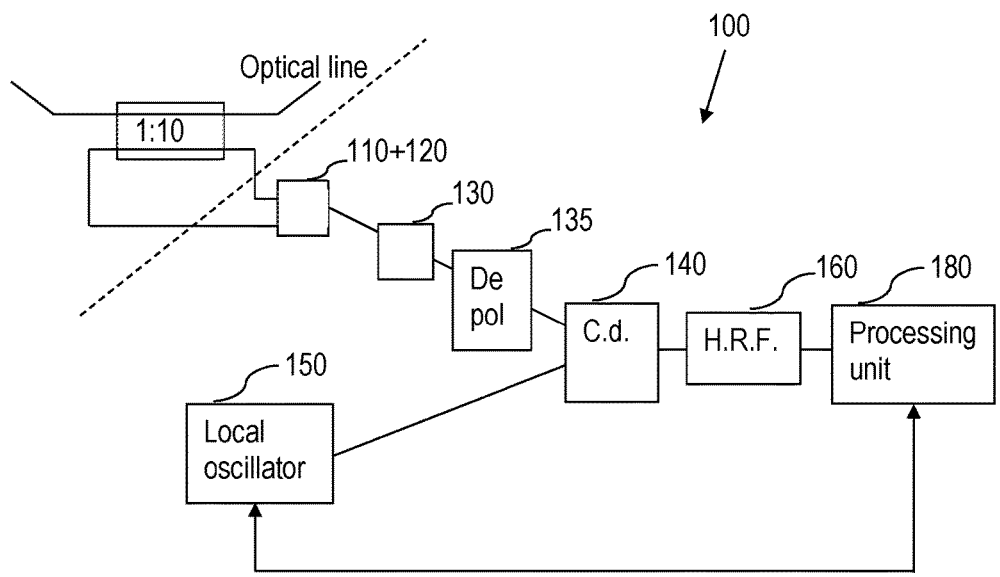
FIG. 1e is an illustration of a coherent optical spectrum analyser for monitoring a spectrum of a fibre link, according to an exemplifying embodiment.

FIG. 1*e* illustrates an embodiment in which the coherent optical spectrum analyser 100 further comprises a depolarisation unit 135, wherein the input 110 is connected to the first input 141 of the coherent detector 140 via the depolarisation unit 135, the depolarisation unit 135 having an input connected to the output of the bandpass filter 130 and having an output connected to the first input 141 of the coherent detector 140 for depolarising the light within the bandwidth to be analysed.

The depolarisation unit 135 depolarises the light within the bandwidth to be analysed. Polarised light changes its detected power when it is detected by the coherent detector, thus distorts the measurement. Depolarised light makes the coherent detector to be insensitive to polarisation changes and detects always the real optical power.

Consequently, the depolarisation unit is configured to depolarise the light before feeding it to the coherent detector 140.

Figure 1F:
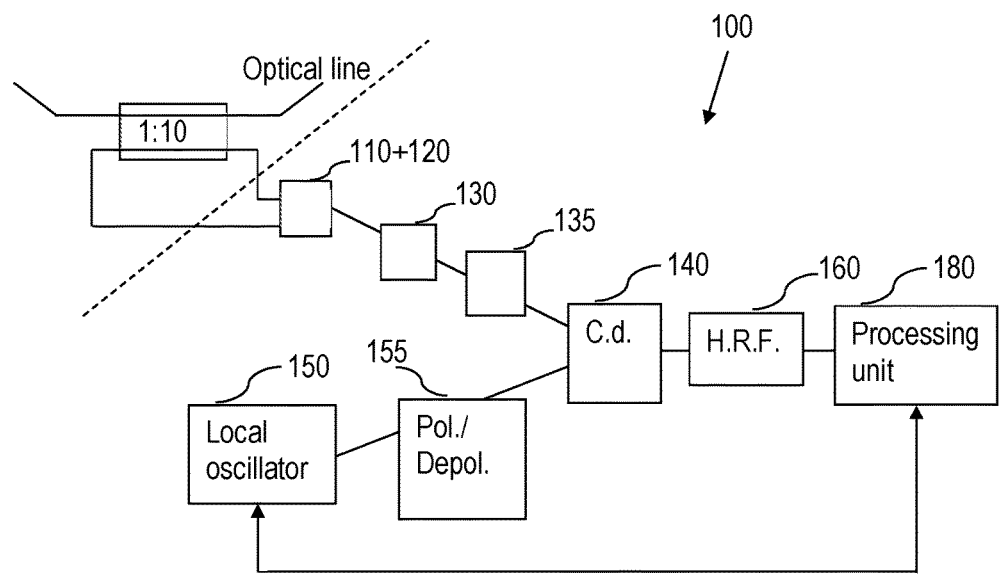
FIG. 1f is an illustration of a coherent optical spectrum analyser for monitoring a spectrum of a fibre link, according to an exemplifying embodiment.

FIG. 1*f* illustrates an embodiment in which the coherent optical spectrum analyser 100 further comprises a polarisation or depolarisation unit 155 having an input connected to the output of the local oscillator 150 and having an output connected to the second input 142 of the coherent detector 140 for polarisation of the wavelengths of the local oscillator 150.

In an example, the unit 155 is a polarisation unit 155. This is a solution, which helps maintaining the local oscillator's polarisation constant, enabling an accurate power measurement less dependant of the input's polarisation.

In another example, the unit 155 is a depolarisation unit 155, which enhances the right power detection even more. The polarisation dependency is nearly removed and a highest accuracy is achieved at the spectrum power measurement.

Figure 1G:
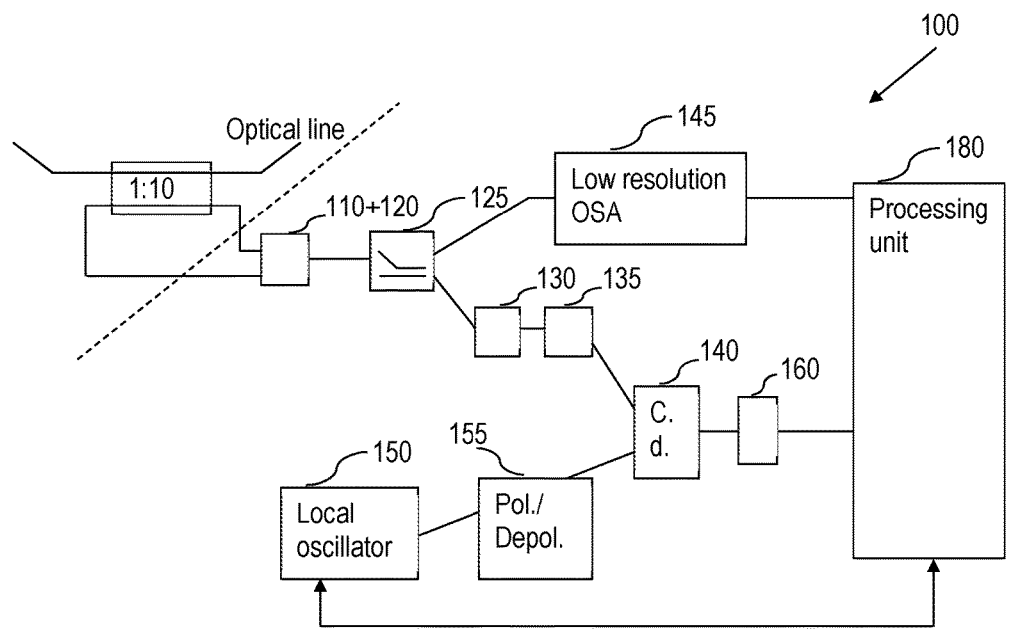
FIG. 1g is an illustration of a coherent optical spectrum analyser for monitoring a spectrum of a fibre link, according to an exemplifying embodiment.

FIG. 1*g* illustrates an embodiment in which the coherent optical spectrum analyser 100 further comprises a first coupler 125, wherein the input 110 is connected to the first input 141 of the coherent detector 140 via the first coupler 125, the first coupler 125 having an input connected to the input 110 of the coherent optical spectrum analyser 100 or to the output of the first switch 120, a first output coupled to an input of a low resolution optical spectrum analyser 145 and a second output connected to the input of the passband filter 130, wherein the low resolution optical spectrum analyser 145 further comprises an output connected to a second input of the processing unit 180.

The first coupler 125 is configured such that a part of, or all, the optical stream signal is fed to the low resolution optical spectrum analyser 145. The low resolution optical spectrum analyser 145 is used for analysing a wider band than the band of the high resolution OSA 160 enabling the possibility of analysing further wavelengths out of the high resolution OSA, hr-OSA, working band. This is a non-coherent system, which gives a more complete data of the working lasers within other bands allowing their monitoring and an accurate interpretation of the hr-OSA's results. Nevertheless this analysis has lower resolution.

Figure 1H:
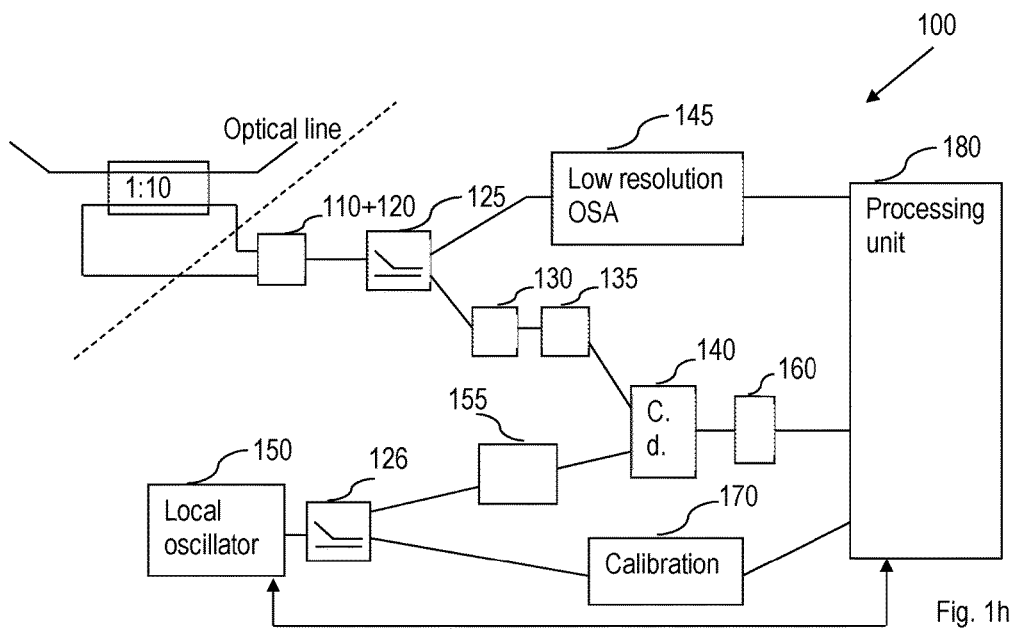
FIG. 1h is an illustration of a coherent optical spectrum analyser for monitoring a spectrum of a fibre link, according to an exemplifying embodiment.

FIG. 1*h* illustrates an embodiment in which the coherent optical spectrum analyser 100 further comprises a second coupler 126, wherein the output of the local oscillator 150 is connected to the second input 142 of the coherent detector 140 via the second coupler 126, the second coupler 126 having an input connected to the output of the local oscillator 150 and also having a first output connected to the second input 142 of the coherent detector 140, and a second output coupled to the input of a calibration set 170, wherein the calibration set 170 further comprises an output connected to a third input of the processing unit 180.

The second coupler 126 is configured such that the calibration unit 170 may be configured between the local oscillator 150 and the processing unit 180. The local oscillator 150 may be made quite inexpensive but then it might need to be calibrated in order to achieve the highest accuracy required in the coherent optical spectrum analyser 100. The calibration may comprise a fiber bragg filter (FBF), which defines an absolute reference; and an etalon (Fabry-Perot, FP, interferometer), which defines all relative references. The calibration unit 170 may further be controlled by the processing unit 180 wherein the processing unit 180 is configured to control both the local oscillator 150 and the calibration unit in order to obtain reduced sweep time and high accuracy.

In the above described examples, the local oscillator 150 may e.g. be manufactured comprising a calibration unit, wherein the calibration unit 170 of FIG. 1*h* is not needed.

Figure 1I:
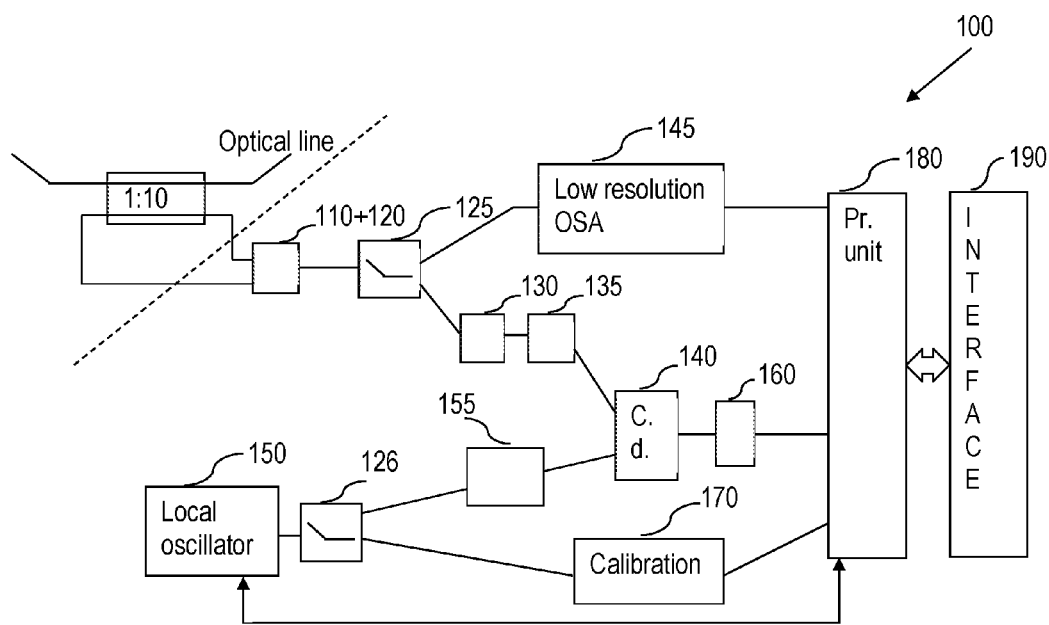
FIG. 1i is an illustration of a coherent optical spectrum analyser for monitoring a spectrum of a fibre link, according to an exemplifying embodiment.

FIG. 1*i* illustrates an embodiment in which the coherent optical spectrum analyser 100 further comprises an interface 190 for outputting the result of the analysis.

The interface 190 enables a user of the coherent optical spectrum analyser 100 to easily monitor and be provided with the monitoring and/or analysing results of the coherent optical spectrum analyser 100. The interface 190 is also configured for the user to operate the coherent optical spectrum analyser 100.

Figure 1J:
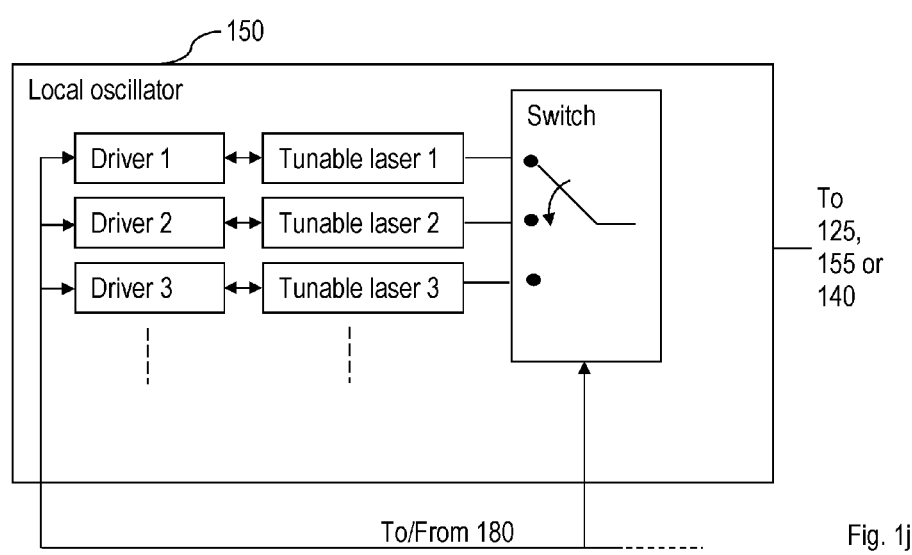
FIG. 1*j* is an illustration of an exemplifying implementation of a local oscillator.

FIG. 1*j* illustrates an exemplifying implementation of the local oscillator 150.

The local oscillator 150 may comprise one or more drives connected to respective tunable lasers, wherein the different drivers control the respective tunable lasers to generate and output light of specific wavelengths. The drivers are further controlled by the processing unit 180 in order to generate light of various wavelengths. The local oscillator 150 may comprise a switch connected to the respective tunable lasers so that the local oscillator 150 is configured to output light from one tunable laser at a time. By the individual tunable lasers outputting light of individually different wavelengths and the switch rapidly switching between the individual tunable lasers, the analysed optical bandwidth becomes wide.

The above described different embodiments and examples may be combined in any arbitrary way. The above described different embodiments and examples provide a coherent optical spectrum analyser 100 that is cost-effective and has variable optical resolution (from GHz to MHz). The above described different embodiments and examples provide a coherent optical spectrum analyser 100 that has a reduced sweep time by tuning the laser by current control and by concatenating lasers, enabling ultra-fast sweeps at each 100 GHz sub-band. Further, the above described different embodiments and examples provide a coherent optical spectrum analyser 100 that has enhanced accuracy by using a synchronised in-line lambda calibration, consisting on a relative reference (FP etalon, i.e. a Fabry Perot interferometer, whose transmission spectrum as a function of wavelength exhibits peaks of large transmission corresponding to resonances of the etalon (50 GHz, 25 GHz . . . ). It may be used as a filter which transmits a maximum at each frequency resonance) and a Bragg grating filter. The local oscillator 150 may comprise standard Distributed Feedback, DFB, lasers.

The above described different embodiments and examples of the coherent optical spectrum analyser meet all requirements to analyse ultra-dense coherent optical networks, achieving extreme resolution lower than 1 GHz and fast sweep time.

The coherent optical spectrum analyser is an instrument that measures high resolution spectrum in 100 GHz sub-bands within the C-Band (i.e. a portion of the optical spectrum within an optical fibre (approx.: 1530 nm-1560 nm). It is generally the most used wavelength band for high capacity optical links). In an example, it comprises a balanced receiver appropriate as a means to suppress the Direct Current, DC, component and maximise the signal photocurrent. It is defined as high resolution OSA, because instead of using an optical resolution filter, it uses an electrical one, which enables much narrower filtering and, consequently, a thousand times higher resolution.

The optical network under analysis may be selected by a through loop input/output configuration (directional coupler), which may provoke 1 dB penalty at the optical stream signal. Using a switch, the signal under study, downstream or upstream, is selected. The subtracted signal may be detected by a balanced receiver, which additionally receives the local oscillator's signal. This may be composed by an array of the same type of DFB lasers but with different central wavelengths. Sub-band tuning may be done by changing laser's temperature; ultra-fast sweep within the sub-band may be done by changing laser's current. The balanced receiver's electrical output may be filtered by selectable filters (1 GHz-10 MHz). In addition, the local oscillator's optical signal may be sent to the synchronised in-line lambda calibration system, which may comprise a fibre bragg grating and an etalon, and provides information about the current wavelength at which the local oscillator is sweeping. Both power and calibration signals may be sent to the processing unit.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A coherent optical spectrum analyser for monitoring a spectrum of a fibre link comprising:
    an input connectable to the fibre link, the input being connected to a first input of
    a coherent detector having at least two inputs including a first input and a second input, and an output,
    a local oscillator having an output connected to the second input of the coherent detector, wherein the output of the coherent detector is connected to a first input of
    a processing unit, the processing unit also being connected to an input of the local oscillator, the processing unit being configured for analysing information from the coherent detector, wherein the local oscillator comprises a semiconductor laser tuned by temperature to a specific wavelength and swept by changing a bias current, the local oscillator being controlled by the processing unit;
    a first switch, wherein the input is connected to the first input of the coherent detector via the first switch, wherein the input comprises two ports, wherein the two ports and the first switch enables the processing unit to analyse the spectrum of the fibre link in both uplink and downlink; and,
    a coupler, wherein the input is connected to the first input of the coherent detector via the first switch and the coupler, the coupler having an input connected to the output of the first switch, the coupler having a first output coupled to an input of a secondary optical spectrum analyser and a second output connected to the first input of the coherent detector, wherein the secondary optical spectrum analyser further comprises an output connected to a second input of the processing unit.

2. The coherent optical spectrum analyser according to claim 1, further comprising a passband filter, wherein the input is connected to the first input of the coherent detector via the coupler, and the passband filter, the passband filter having an input connected to the output of the coupler, the passband filter having an output connected to the first input of the coherent optical spectrum analyser, and wherein the passband filter filters the spectrum of the fibre link so that a bandwidth defined by the passband filter is analysed by the processing unit.

3. The coherent optical spectrum analyser according to claim 1, further comprising a set of filters, wherein the output of the coherent detector is connected to a first input of the processing unit via the set of filters, the set of filters having an input connected to the output of the coherent detector and an output coupled to the first input of the processing unit, the set of filters being controlled by the processing unit, wherein the processing unit uses an output of the set of filters to select a filter from the set of filters according to a resolution needed.

4. The coherent optical spectrum analyser according to claim 1, further comprising a depolarisation unit, wherein the input is connected to the first input of the coherent detector via the depolarisation unit, the depolarisation unit having an input connected to the output of the coupler and having an output connected to the first input of the coherent detector, wherein the depolarisation unit is for depolarising light within a bandwidth to be analysed.

5. The coherent spectrum analyser according to claim 1, further comprising a polarisation or depolarisation unit having an input coupled to the output of the local oscillator and having an output coupled to the second input of the coherent detector, wherein the polarisation or depolarisation unit for polarisation of wavelengths of the local oscillator.

6. The coherent optical spectrum analyser according to claim 1, further comprising an interface for outputting a result of the analysis.

7. A coherent optical spectrum analyser for monitoring a spectrum of a fibre link comprising:
    an input connectable to the fibre link, the input being connected to a first input of
    a coherent detector having at least two inputs including a first input and a second input, and an output,
    a local oscillator having an output connected to the second input of the coherent detector, wherein the output of the coherent detector is connected to a first input of a processing unit, the processing unit also being connected to an input of the local oscillator, the processing unit being configured for analysing information from the coherent detector, wherein the local oscillator comprises a semiconductor laser tuned by temperature to a specific wavelength and swept by changing a bias current, the local oscillator being controlled by the processing unit;

a switch, wherein the input is connected to the first input of the coherent detector via the switch, wherein the input comprises two ports, wherein the two ports and the switch enables the processing unit to analyse the spectrum of the fibre link in both uplink and downlink; and, a coupler, wherein the output of the local oscillator is connected to the second input of the coherent detector via the coupler, the coupler having an input connected to the output of the local oscillator, the coupler also having a first output connected to the second input of the coherent detector, and the coupler having a second output coupled to an input of a calibration set, wherein the calibration set further comprises an output connected to an input of the processing unit.

* * * * *